US012560251B2

(12) United States Patent
Wei et al.

(10) Patent No.: US 12,560,251 B2
(45) Date of Patent: Feb. 24, 2026

(54) VALVE SPRING HOLDER, VALVE BOX, AND PLUNGER PUMP

(71) Applicant: Yantai Jereh Petroleum Equipment & Technologies Co., Ltd., Shandong (CN)

(72) Inventors: Xiaosong Wei, Yantai (CN); Chen Jiang, Yantai (CN); Haiping Cui, Yantai (CN); Xiaobin Li, Yantai (CN); Wenping Cui, Yantai (CN); Peng Li, Yantai (CN); Anpeng Ge, Yantai (CN)

(73) Assignee: YANTAI JEREH PETROLEUM EQUIPMENT & TECHNOLOGIES CO., LTD., Yantai (CN)

( * ) Notice: Subject to any disclaimer, the term of this patent is extended or adjusted under 35 U.S.C. 154(b) by 268 days.

(21) Appl. No.: 18/209,483

(22) Filed: Jun. 14, 2023

(65) Prior Publication Data

US 2023/0323969 A1     Oct. 12, 2023

Related U.S. Application Data

(63) Continuation of application No. PCT/CN2022/116723, filed on Sep. 2, 2022.

(30) Foreign Application Priority Data

Sep. 28, 2021    (CN) .......................... 202122363943.9

(51) Int. Cl.
*F16K 15/06*          (2006.01)
*E21B 43/26*          (2006.01)
(52) U.S. Cl.
CPC ........ *F16K 15/063* (2013.01); *E21B 43/2607* (2020.05)
(58) Field of Classification Search
CPC ..... F16K 15/063; E21B 43/2607; F04B 53/10
See application file for complete search history.

(56) References Cited

U.S. PATENT DOCUMENTS

| | | | | |
|---|---|---|---|---|
| 7,681,589 B2 * | 3/2010 | Schwegman | ........... | F16K 15/18 137/543.13 |
| 2014/0086774 A1 | 3/2014 | Chandrasekaran et al. | | |
| 2017/0159655 A1 | 6/2017 | Morreale et al. | | |

FOREIGN PATENT DOCUMENTS

| | | |
|---|---|---|
| CN | 110206724 A | 9/2019 |
| CN | 111692065 A | 9/2020 |

(Continued)

OTHER PUBLICATIONS

International Search Report and Written Opinion mailed on Oct. 17, 2022, received for PCT Application PCT/CN2022/116723, filed on Sep. 2, 2022, 11 pages including English Translation.

*Primary Examiner* — Eric Keasel
(74) *Attorney, Agent, or Firm* — XSENSUS LLP

(57) ABSTRACT

A valve spring holder, a valve box, and a plunger pump. The valve spring holder includes a body part, a first supporting part, a second supporting part, a spring mounting part, and a limiting groove. The first supporting part is connected to a first end part of the body part. The second supporting part is connected to a second end part of the body part. The spring mounting part is connected to a middle part of the body part. The first supporting part includes a first supporting surface, the second supporting part includes a second supporting surface, the first supporting surface and the second supporting surface are in contact with the valve box, and the limiting groove is located in at least one of the first supporting part and second supporting part, and is exposed to at least one of the first supporting surface and second supporting surface.

17 Claims, 6 Drawing Sheets

100

(56)     References Cited

FOREIGN PATENT DOCUMENTS

| CN | 112922827 A | 6/2021 |
| CN | 216111233 U | 3/2022 |

* cited by examiner

30

30

30

30

100

100

900/300

100

100

200

VALVE SPRING HOLDER, VALVE BOX, AND PLUNGER PUMP

CROSS-REFERENCE TO RELATED APPLICATIONS

This application is a continuation of PCT international patent application PCT/CN2022/116723 filed on Sep. 2, 2022, which claims the priority of Chinese Patent Application No. 202122363943.9 filed on Sep. 28, 2021, each of which is hereby incorporated by reference as a part of this application.

TECHNICAL FIELD

Embodiments of the disclosure relates to a valve spring holder, a valve box, and a plunger pump.

BACKGROUND

In the field of oil and natural gas extraction, fracturing operation is a technique that uses a high-pressure fracturing fluid to form fractures in oil and gas formations during oil or gas extraction. Fracturing operation can cause fractures in oil and gas formations, thereby improving the underground flow environment of oil or natural gas and increasing the oil well production. Therefore, fracturing operation is the main way to increase production in oil and gas extraction.

Typically, fracturing equipment includes a prime mover and a plunger pump. The prime mover provides mechanical power to the plunger pump. The plunger pump converts the rotational movement of the crankshaft into the reciprocating movement of the plunger by using the crankshaft connecting rod mechanism, and pressurizes the liquid by using the reciprocating motion of the plunger in the cavity inside the valve box, thus realizing high-pressure pumping of fracturing media in fracturing operation.

SUMMARY

Embodiments of the disclosure provide a valve spring holder, a valve box, and a plunger pump. The valve spring holder includes a body part, a first supporting part, a second supporting part, a spring mounting part, and a limiting groove. The body part includes a first end part, a second end part, and a middle part located between the first end part and the second end part. The first supporting part is connected to the first end part and located on a first side of the body part. The second supporting part is connected to the second end part and located on the first side of the body part. The spring mounting part is connected to the middle part and located on a second side of the body part. The second side and the first side are two opposite sides. The limiting groove is configured to place a limiting component. The first supporting part includes a first supporting surface located at one end of the first supporting part away from the first end part. The second supporting part includes a second supporting surface located at one end of the second supporting part away from the second end part. The first supporting surface and the second supporting surface are configured to be in contact with a valve box. The limiting groove is located in at least one of the first supporting part and the second supporting part, and exposed to at least one of the first supporting surface and the second supporting surface. Thereby, the valve spring holder can provide a novel structure for holding a valve spring, which can prevent the pressure of a fluid from being conducted to a sealing component, and has the advantages of simple structure, easy installation, and small throttling area, etc.

At least one embodiment of the disclosure provides a valve spring holder, including: a body part, including a first end part, a second end part, and a middle part located between the first end part and the second end part; a first supporting part, connected to the first end part and located on a first side of the body part; a second supporting part, connected to the second end part and located on the first side of the body part; a spring mounting part, connected to the middle part and located on a second side of the body part, the second side and the first side being two opposite sides; and a limiting groove, configured to place a limiting component. The first supporting part includes a first supporting surface located at one end of the first supporting part away from the first end part. The second supporting part includes a second supporting surface located at one end of the second supporting part away from the second end part. The first supporting surface and the second supporting surface are configured to be in contact with a valve box. The limiting groove is located in at least one of the first supporting part and the second supporting part, and exposed to at least one of the first supporting surface and the second supporting surface.

For example, in the valve spring holder according to an embodiment of the disclosure, the limiting groove is also located at the body part.

For example, in the valve spring holder according to an embodiment of the disclosure, the first supporting part extends along a first direction, and the second supporting part extends along a second direction. An included angle between the first direction and a direction perpendicular to a first surface of the body part ranges from 120 to 150 degrees, and an included angle between the second direction and a direction perpendicular to the first surface of the body part ranges from 120 to 150 degrees.

For example, in the valve spring holder according to an embodiment of the disclosure, the limiting groove includes a first end and a second end. The first end is located on the first supporting surface. The second end is located at the second end part. The limiting groove extends from the first supporting surface to the second end part.

For example, in the valve spring holder according to an embodiment of the disclosure, the limiting groove is exposed to the first surface of the body part located on the first side and a surface of the first supporting part connected to the first surface.

For example, in the valve spring holder according to an embodiment of the disclosure, the second end runs through the body part and is exposed to the second surface of the body part located on the second side.

For example, in the valve spring holder according to an embodiment of the disclosure, the limiting groove includes a first end and a second end. The first end is located on the first supporting surface. The second end is located on the second supporting surface. The limiting groove extends from the first supporting surface to the second supporting surface.

For example, in the valve spring holder according to an embodiment of the disclosure, the limiting groove is exposed to the first surface of the body part located on the first side, a surface of the first supporting part connected to the first surface, and a surface of the second supporting part connected to the first surface.

For example, the valve spring holder according to an embodiment of the disclosure further includes: a limiting component, located in the limiting groove. The limiting component includes a limiting part, and the limiting part protrudes from the first supporting surface and/or the second supporting surface.

For example, in the valve spring holder according to an embodiment of the disclosure, the limiting component includes a circlip.

For example, the valve spring holder according to an embodiment of the disclosure further includes: a pin hole, located in the first supporting part and/or the second supporting part and running through the limiting groove; and a limiting pin, configured to be inserted into the pin hole so as to fix the limiting component in the limiting groove.

At least one embodiment of the disclosure further provides a valve box, including: a valve box body; a first cavity, located in the valve box body and extending along a third direction; a supporting slot, located on an inner side wall of the first cavity and extending along a circumferential direction of the first cavity; and a valve box recess. The supporting slot includes an inclined side wall, configured to be in contact with the first supporting surface and the second supporting surface. The valve box recess intersects with the inclined side wall and extends along the third direction.

For example, the valve box according to an embodiment of the disclosure further includes: a second cavity, located in the valve box body and extending along a fourth direction. The second cavity and the first cavity intersect and form an intersection region, and the supporting slot and the valve box recess are located in the intersection region.

At least one embodiment of the disclosure further provides a plunger pump, including the valve spring holder according to any one of the above and the valve box according to any one of the above. The first supporting surface and the second supporting surface are configured to be in contact with the supporting slot, and the limiting component is partially located in the valve box recess.

BRIEF DESCRIPTION OF DRAWINGS

In order to more clearly illustrate the technical solutions in the embodiments of the disclosure, the accompanying drawings of the embodiments will be briefly described below. Apparently, the accompanying drawings in the description below merely involve some embodiments of the disclosure, and are not intended to limit the disclosure.

4

Figures 9, 10:
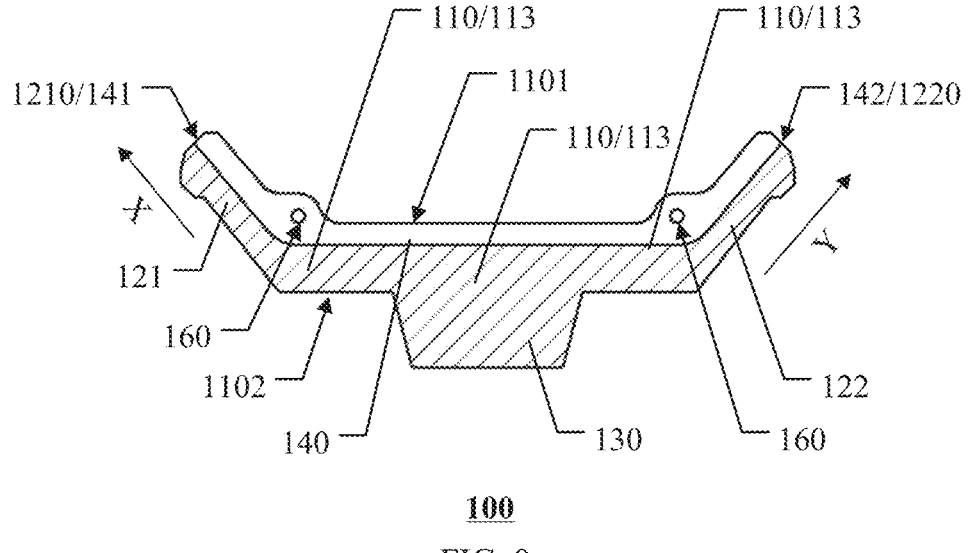
FIG. 9 is a schematic cross-sectional view of the valve spring holder shown in FIG. 8.

FIG. 10 is a schematic structural view of a valve box according to an embodiment of the disclosure.

DETAILED DESCRIPTION

To make the objectives, technical solutions and advantages of the embodiments of the disclosure clearer, the technical solutions of the embodiments of the disclosure will be described clearly and completely in conjunction with the accompanying drawings of the embodiments of the disclosure. Apparently, the described embodiments are some but not all of the embodiments of the disclosure. Based on the described embodiments of the disclosure, all other embodiments obtained by those ordinary persons skilled in the art without creative labor shall fall within the protection scope of the disclosure.

Unless otherwise defined, the technical terms or scientific terms used in the disclosure shall have the ordinary meanings understood by those skilled in the art to which the disclosure belongs. The terms "first", "second" and similar words used in the disclosure do not indicate any order, quantity or importance, but are only used to distinguish different components. Similar words such as "comprise" or "include" or the like mean that the elements or objects appearing before the word cover the elements or objects listed after the word and equivalents thereof, but do not exclude other elements or objects. Similar words such as "connected to" or "connected with" are not limited to physical or mechanical connections, but may include electrical connections, whether direct or indirect.

Typically, a plunger pump includes a power end and a fluid end. The power end may include a crankshaft connecting rod mechanism, and the fluid end includes a cavity and a plurality of valve components located in the cavity. The fluid end is configured to convert a low-pressure fluid into a high-pressure fluid. The high-pressure fluid needs to flow in the cavity and the cavity needs to bear alternating pressures, so it is necessary to keep the cavity simple and unobstructed.

Figure 1:
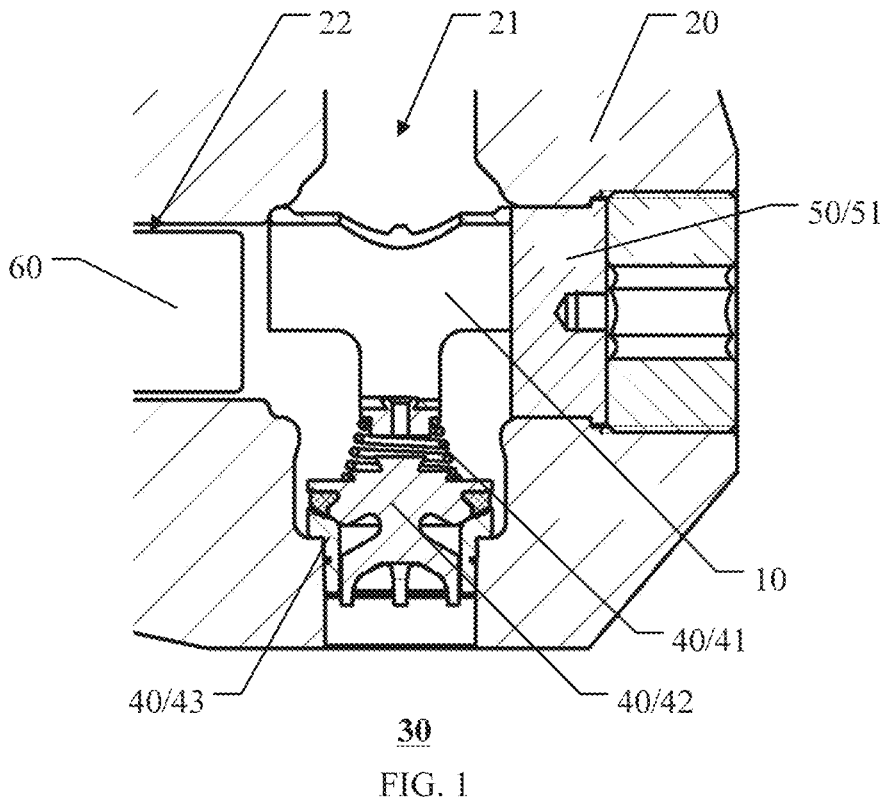
FIG. 1 is a schematic structural view of a fluid end.

FIG. 1 is a schematic structural view of a fluid end. As shown in FIG. 1, the fluid end 30 includes a valve box 20, a first cavity 21 and a second cavity 22 located in the valve box 20, a valve spring bracket 10 and a valve component 40. The valve component 40 includes a valve spring 41, a valve body 42 and a valve seat sleeve 43. One end of the valve spring 41 is connected to the valve spring bracket 10, and the other end of the valve spring 41 is connected to the valve body 42. The valve seat sleeve 43 is fixed in the first cavity 21 and includes a middle hole. Under the action of elastic force of the valve spring 41, the valve body 42 is located in the valve seat sleeve 43 and seals the middle hole of the valve seat sleeve 43. When a fluid flows along a direction from the valve body 42 to the valve spring bracket 10, the fluid may apply a pressure to the valve body 42 such that the valve spring 41 is in a compressed state, and at this time, the fluid can flow through the middle hole of the valve seat sleeve 43. When the fluid flows along a direction from the valve spring bracket 10 to the valve body 42, the valve body 42 is subjected to a force toward the valve seat sleeve 43, and at this time, the fluid cannot flow through the middle hole of the valve seat sleeve 43. Thereby, the valve component 40 can function as a one-way valve.

As shown in FIG. 1, the valve spring bracket 10 has a cylindrical shape. One end of the valve spring bracket 10 is in contact with an inner side wall of the first cavity 21, and the other end of the valve spring bracket 10 is in contact with a sealing component 50 (e.g., gland nut 51) arranged at one end of the second cavity 22. When the plunger pump 60 makes a reciprocating motion in the second cavity 22, the valve spring bracket 10 is susceptible to the pressure of the fluid and conducts the pressure to the sealing component 50, so that the sealing component 50 is subjected to greater force. Therefore, the thread of the sealing component 50 is subjected to harsher forces and is prone to fatigue fracture and other problems, which may lead to the failure of the entire fluid end.

Figure 2:
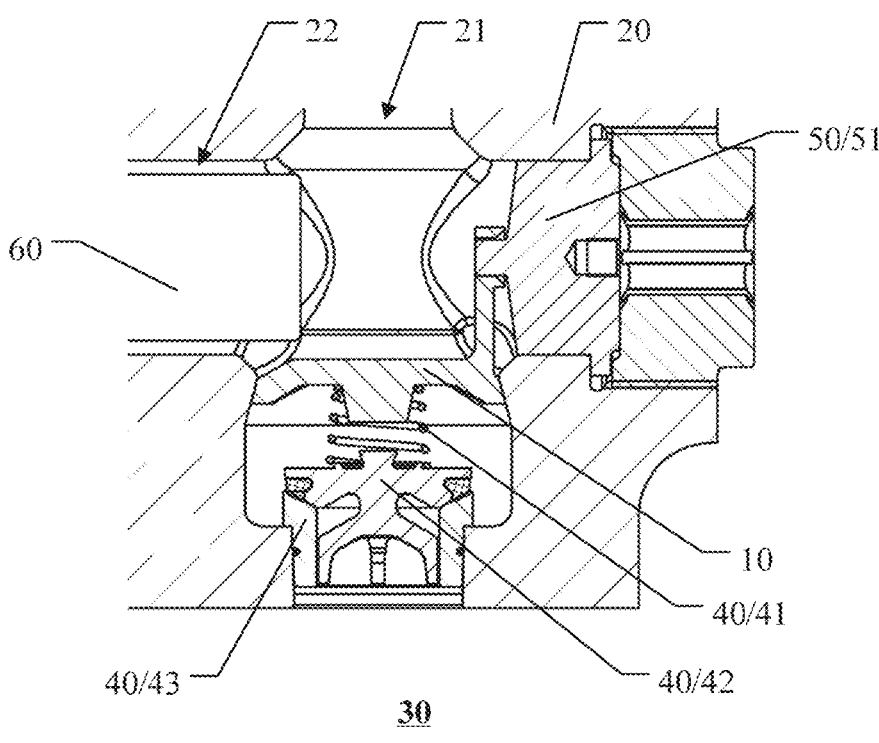
FIG. 2 is a schematic structural view of another plunger pump.

FIG. 2 is a schematic structural view of another plunger pump. As shown in FIG. 2, similar to the fluid end shown in FIG. 1, the fluid end 30 also includes a valve box 20, a first cavity 21 and a second cavity 22 located in the valve box 20, a valve spring bracket 10 and a valve component 40.

As shown in FIG. 2, the valve spring bracket 10 has an L shape. One end of the valve spring bracket 10 is in contact with an inner side wall of the first cavity 21, and the other end of the valve spring bracket 10 is directly fixed to a sealing component 50 (e.g., gland nut 51) arranged at one end of the second cavity 22. On the one hand, when the plunger pump 60 makes a reciprocating motion in the second cavity 22, the valve spring bracket 10 is susceptible to the pressure of the fluid and directly conducts the pressure to the sealing component 50, so that the sealing component 50 is subjected to greater force. As a result, the thread of the sealing component 50 is subjected to harsher forces and is prone to fatigue fracture and other problems, which may lead to the failure of the entire fluid end. On the other hand, due to the narrow space of the first cavity 21, it is difficult to mount the valve spring bracket 10, which easily leads to improper installation and causes damage to other components during operation. In addition, the valve spring bracket 10 needs to be connected to the sealing component 50, so the connecting part leads to large throttling area of the valve spring bracket 10, which is not conducive to the flow of the fluid.

Figure 3A:
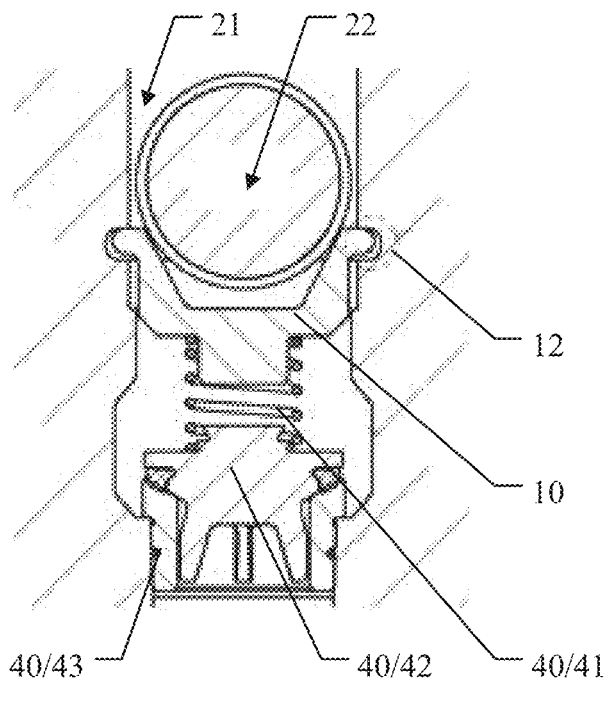
FIG. 3A to FIG. 3B are schematic structural views of another plunger pump.
Figure 3B:
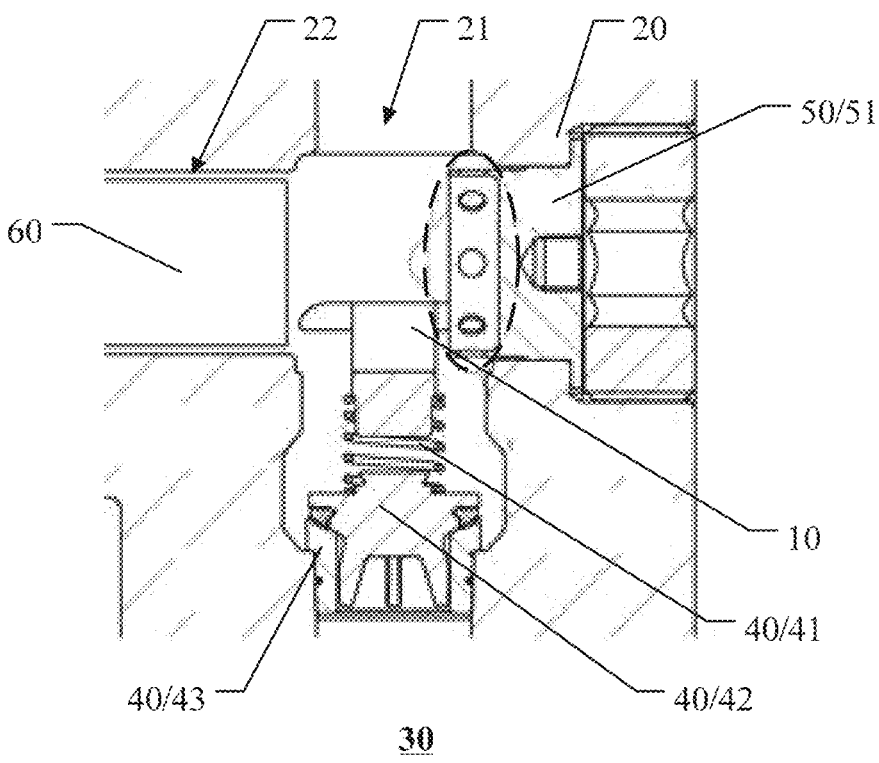

FIG. 3A to FIG. 3B are schematic structural views of another plunger pump. As shown in FIG. 3A to FIG. 3B, similar to the fluid end shown in FIG. 1, the fluid end 30 also includes a valve box 20, a first cavity 21 and a second cavity 22 located in the valve box 20, a valve spring bracket 10 and a valve component 40.

As shown in FIG. 3A to FIG. 3B, the valve spring bracket 10 includes two supporting parts 12 that are in contact with an inner side wall of the first cavity 21 respectively. In order to limit the rotation of the valve spring bracket 10, the sealing component 50 protrudes from the inner side wall (as shown by the dashed box in FIG. 3B) of the first cavity 21, resulting in large throttling area of the valve spring bracket 10.

In view of this, embodiments of the disclosure provide a valve spring holder, a valve box, and a plunger pump. The valve spring holder includes a body part, a first supporting part, a second supporting part, a spring mounting part, and a limiting groove. The body part includes a first end part, a second end part, and a middle part located between the first end part and the second end part. The first supporting part is connected to the first end part and located on a first side of the body part. The second supporting part is connected to the second end part and located on the first side of the body part. The spring mounting part is connected to the middle part and located on a second side of the body part. The second side and the first side are two opposite sides. The limiting groove is configured to place a limiting component. The first supporting part includes a first supporting surface located at one end of the first supporting part away from the first end part. The second supporting part includes a second supporting surface located at one end of the second supporting part away from the second end part. The first supporting surface and the second supporting surface are configured to be in contact with a valve box. The limiting groove is located in at least one of the first supporting part and the second supporting part, and exposed to at least one of the first supporting surface and the second supporting surface. Thereby, the valve spring holder can provide a novel structure for holding a valve spring, which can prevent the pressure of a fluid from being conducted to a sealing component, and has the advantages of simple structure, easy installation, and small throttling area, etc.

The valve spring holder, the valve box and the plunger pump according to the embodiments of the disclosure will be described in detail below in conjunction with the accompanying drawings.

Figure 4:
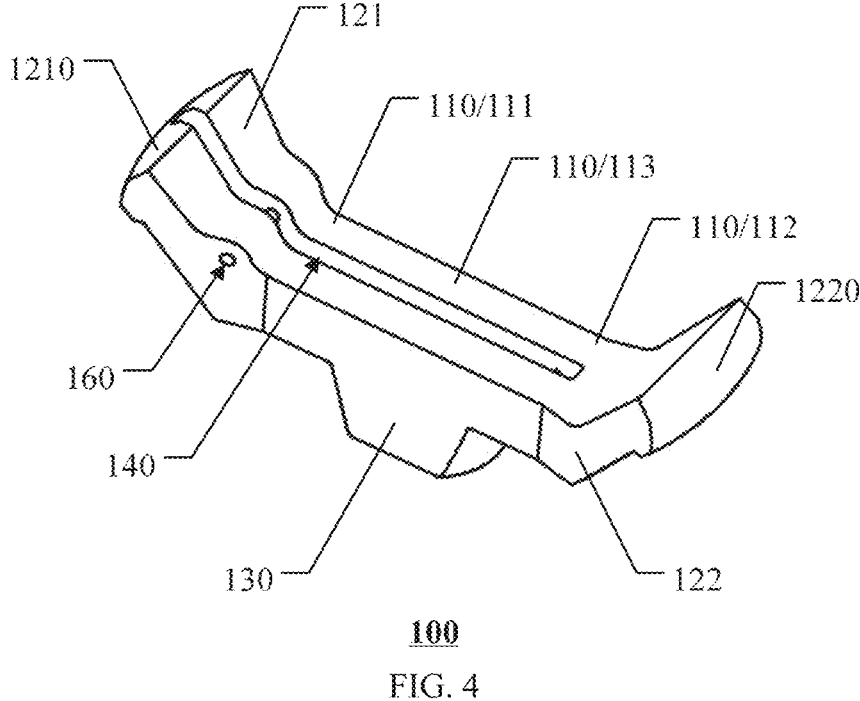
FIG. 4 is a schematic structural view of a valve spring holder according to an embodiment of the disclosure.
Figure 5:
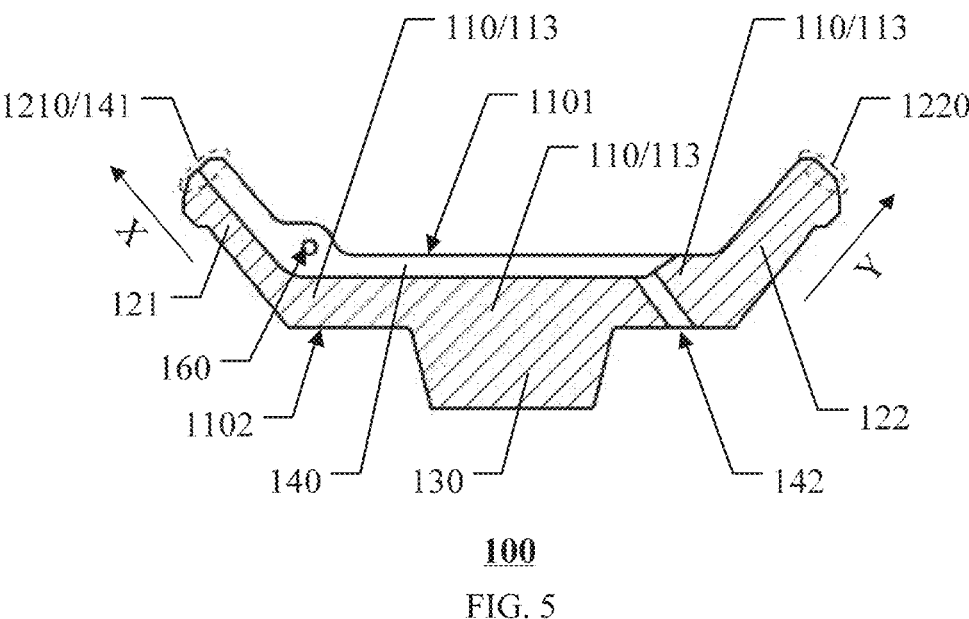
FIG. 5 is a schematic cross-sectional view of the valve spring holder shown in FIG. 4.

Embodiments of the disclosure provide a valve spring holder. FIG. 4 is a schematic structural view of a valve spring holder according to an embodiment of the disclosure. FIG. 5 is a schematic cross-sectional view of the valve spring holder shown in FIG. 4.

As shown in FIG. 4 and FIG. 5, the valve spring holder 100 includes a body part 110, a first supporting part 121, a second supporting part 122, a spring mounting part 130, and a limiting groove 140. The first supporting part 121, the body part 110 and the second supporting part 122 can form a C-shaped structure, so that the plunger can move above the body part 110.

As shown in FIG. 4 and FIG. 5, the body part 110 includes a first end part 111, a second end part 112, and a middle part 113 located between the first end part 111 and the second end part 112. The first supporting part 121 is connected to the first end part 111 and located on a first side of the body part 110. The second supporting part 122 is connected to the second end part 112 and located on the first side of the body part 110. That is, the first supporting part 121 and the second supporting part 122 are located on the same side of the body part 110.

As shown in FIG. 4 and FIG. 5, the spring mounting part 130 is connected to the middle part 113 and located on a second side of the body part 113, and the second side and the first side are two opposite sides. That is, the spring mounting part 130 is located on the side of the body part 110 away from the first supporting part 121 and the second supporting part 122. The limiting groove 140 is configured to place a limiting component. The limiting component may be configured to limit the rotation of the valve spring holder 100.

As shown in FIG. 4 and FIG. 5, the first supporting part 121 includes a first supporting surface 1210 located at one end of the first supporting part 121 away from the first end part 111. The second supporting part 122 includes a second supporting surface 1220 located at one end of the second supporting part 122 away from the second end part 112. The first supporting surface 1210 and the second supporting surface 1220 are configured to be in contact with the valve box, so as to fix the valve spring holder 100 inside the valve box. The limiting groove 140 is located in at least one of the first supporting part 121 and the second supporting part 122, and exposed to at least one of the first supporting surface 1210 and the second supporting surface 1220. It is to be noted that the above-mentioned "exposed" means that the limiting groove runs through the first supporting surface or the second supporting surface so as not to be blocked by the first supporting surface and the second supporting surface.

Figure 6:
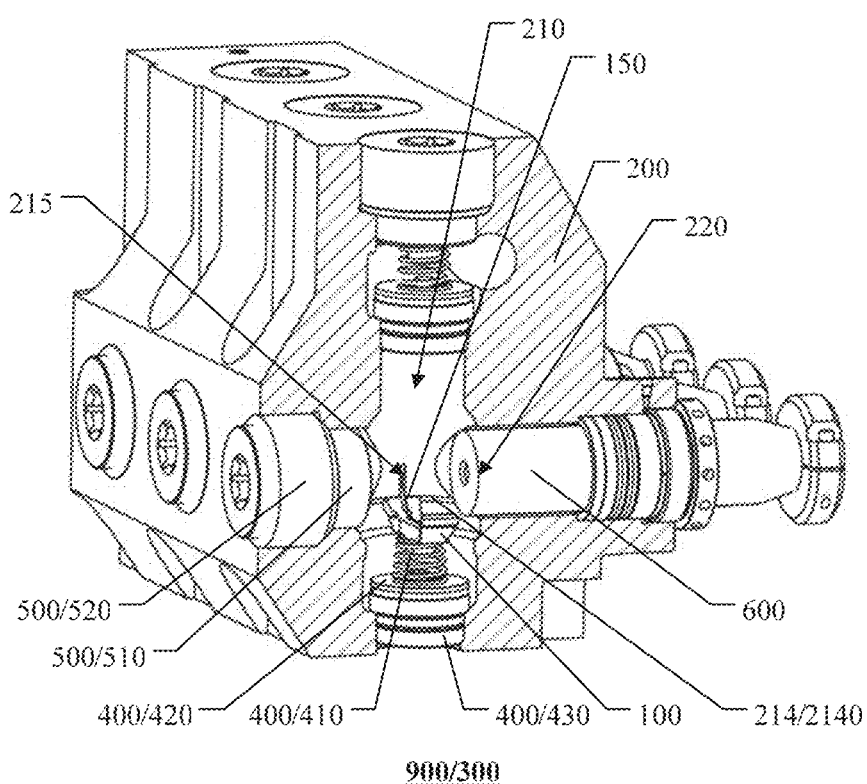
FIG. 6 is a schematic structural view of a fluid end in a plunger pump according to an embodiment of the disclosure.
Figure 7A:
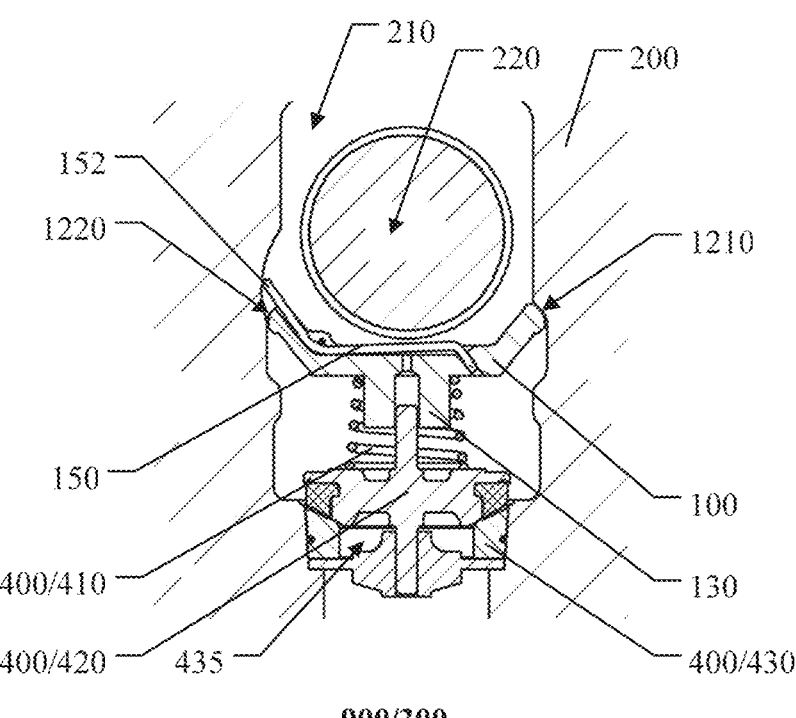
FIG. 7A is a schematic cross-sectional view of a fluid end in a plunger pump according to an embodiment of the disclosure.
Figure 7B:
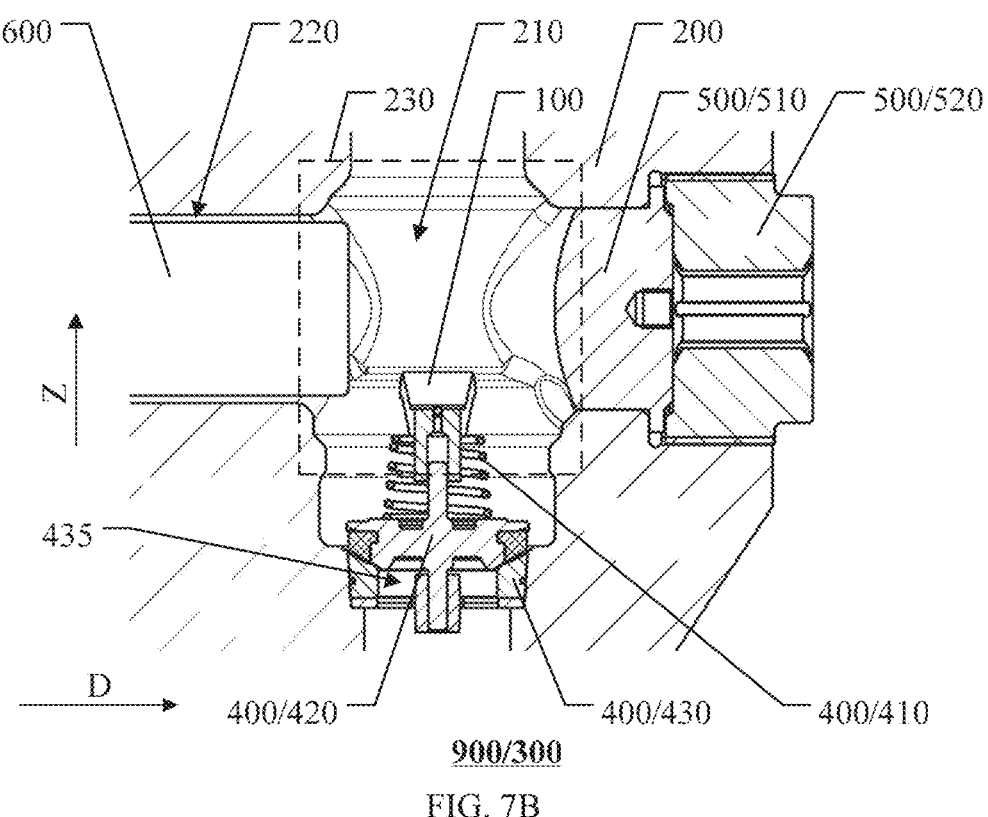
FIG. 7B is a schematic cross-sectional view of a fluid end in another plunger pump according to an embodiment of the disclosure.

FIG. 6 is a schematic structural view of a fluid end in a plunger pump according to an embodiment of the disclosure. FIG. 7A is a schematic cross-sectional view of a fluid end in a plunger pump according to an embodiment of the disclosure. FIG. 7B is a schematic cross-sectional view of a fluid end in another plunger pump according to an embodiment of the disclosure.

As shown in FIG. 6, FIG. 7A and FIG. 7B, the fluid end 300 is provided with the valve spring holder 100 described above. By configuring the first supporting surface 1210 and the second supporting surface 1220 to be in contact with the valve box 200, the first supporting part 121 and the second supporting part 122 can fix the valve spring holder 100 in a cavity 210 inside the valve box 200. The limiting groove 140 may be configured to place a limiting component 150. The limiting component 150 may be exposed from the first supporting surface 1210 and/or the second supporting surface 1220, and clamped in a valve box recess 215 in an inner side wall of the cavity 210, thereby limiting the rotation of the valve spring holder 100.

On the one hand, since the valve spring holder does not need to be in contact with or connected with the sealing component at the end part of the cavity, the force produced by the fluid will not be conducted to the sealing component, thereby avoiding fatigue fracture of the thread of the sealing component and other problems. On the other hand, the valve spring holder is simple in structure, and the limiting component can be clamped in the valve box recess by rotating the valve spring holder after the body part, the first supporting part and the second supporting part of the valve spring holder are stalled in place, so the valve spring holder is less difficult to install. It is to be noted that the limiting component may be elastic, so the limiting component is convenient to be clamped in the valve box recess in the narrow cavity. In addition, since the valve spring holder is simple in structure and does not need to be connected with the sealing component, the valve spring holder has smaller throttling area and smaller obstruction to the flow of the fluid, thereby improving the efficiency of the fluid end.

In some examples, as shown in FIG. 6, FIG. 7A and FIG. 7B, the valve spring holder 100 further includes the limiting component 150 located in the limiting groove 140. The limiting component 150 includes a limiting part 152, and the limiting part 152 protrudes from the first supporting surface 1210 and/or the second supporting surface 1220.

In some examples, as shown in FIG. 6, FIG. 7A and FIG. 7B, the limiting component 150 includes a circlip. The circlip is elastic, so the circlip is convenient to be installed in the narrow cavity. Of course, the embodiments of the disclosure are not limited thereto. The limiting component may also be other structures.

In some examples, as shown in FIG. 4 and FIG. 5, the limiting groove 140 is also located at the body part 110. Thereby, the limiting component 150 has larger contact area with the valve spring holder 100, and thus, is more stable.

In some examples, as shown in FIG. 4 and FIG. 5, the first supporting part 121 extends along a first direction X, and the second supporting part 122 extends along a second direction Y. It is to be noted that the first supporting part 121 extends along a direction from the first end part 111 to the first supporting surface 1210, and the second supporting part 122 may extend along a direction from the second end part 112 to the second supporting surface 1220.

In some examples, as shown in FIG. 4 and FIG. 5, an included angle between the first direction X and a direction perpendicular to a first surface 1101 of the body part 110 located on the first side ranges from 120 to 150 degrees, and an included angle between the second direction Y and a direction perpendicular to the first surface 1101 of the body part 110 located on the first side ranges from 120 to 150 degrees. Thereby, the valve spring holder can have better mechanical properties and smaller throttling area.

In some examples, as shown in FIG. 4 and FIG. 5, the limiting groove 140 includes a first end 141 and a second end 142. The first end 141 is located on the first supporting surface 1210. The second end 142 is located at the second end part 112. The limiting groove 140 extends from the first supporting surface 1210 to the second end part 112, so that the limiting groove can be better fixed in the body part 110 and the first supporting part 121.

In some examples, as shown in FIG. 4 and FIG. 5, the limiting groove 140 is exposed to the first surface 1101 of the body part 110 located on the first side and a surface of the first supporting part 121 connected to the first surface 1101. Thereby, the limiting component can be placed in the limiting groove conveniently.

In some examples, as shown in FIG. 4 and FIG. 5, the second end 142 runs through the body part 110, and is exposed to the second surface 1102 of the body part 110 located on the second side, so that the limiting component can be better limited in the limiting groove, thereby avoiding the limiting component from popping out.

In some examples, as shown in FIG. 4 and FIG. 5, the valve spring holder 100 further includes a pin hole 160 and a limiting pin 170. The pin hole 160 is located in the first supporting part 121 and runs through the limiting groove 140. The limiting pin 170 is configured to be inserted into the pin hole 160 so as to fix the limiting component 150 in the limiting groove 140.

Figure 8:
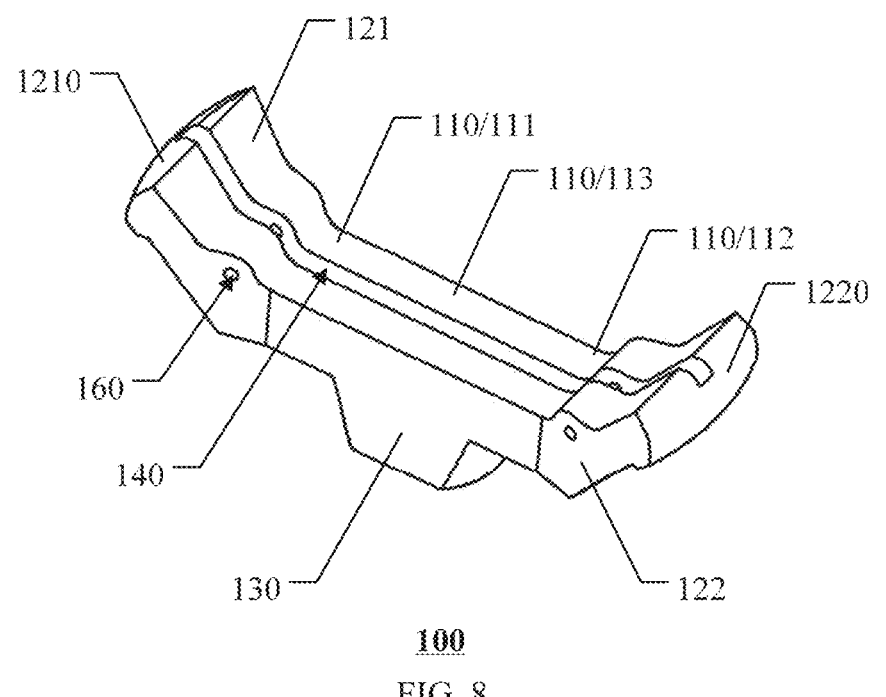
FIG. 8 is a schematic structural view of another valve spring holder according to an embodiment of the disclosure.

FIG. 8 is a schematic structural view of another valve spring holder according to an embodiment of the disclosure. FIG. 9 is a schematic cross-sectional view of the valve spring holder shown in FIG. 8. As shown in FIG. 8 and FIG. 9, the valve spring holder 100 includes a body part 110, a first supporting part 121, a second supporting part 122, a spring mounting part 130, and a limiting groove 140. The first supporting part 121, the body part 110 and the second supporting part 122 can form a C-shaped structure, so that the plunger can move above the body part 110.

As shown in FIG. 8 and FIG. 9, the body part 110 includes a first end part 111, a second end part 112, and a middle part 113 located between the first end part 111 and the second end part 112. The first supporting part 121 is connected to the first end part 111 and located on a first side of the body part 110. The second supporting part 122 is connected to the second end part 112 and located on the first side of the body part 110. That is, the first supporting part 121 and the second supporting part 122 are located on the same side of the body part 110.

As shown in FIG. 8 and FIG. 9, the spring mounting part 130 is connected to the middle part 113 and located on a second side of the body part 113, and the second side and the first side are two opposite sides. That is, the spring mounting part 130 is located on the side of the body part 110 away from the first supporting part 121 and the second supporting part 122. The limiting groove 140 is configured to place a limiting component. The limiting component may be configured to limit the rotation of the valve spring holder 100.

As shown in FIG. 8 and FIG. 9, the first supporting part 121 includes a first supporting surface 1210 located at one end of the first supporting part 121 away from the first end part 111. The second supporting part 122 includes a second supporting surface 1220 located at one end of the second supporting part 122 away from the second end part 112. The first supporting surface 1210 and the second supporting surface 1220 are configured to be in contact with the valve box, so as to fix the valve spring holder 100 inside the valve box. The limiting groove 140 includes a first end 141 and a second end 142. The first end 141 is located on the first supporting surface 1210. The second end 142 is located on the second supporting surface 1220. The limiting groove 140 extends from the first supporting surface 1210 to the second supporting surface 1220. Thereby, the limiting groove 140 has a larger length, and both of the two ends of the limiting component 150 are clamped in the valve box recess, thereby further increasing the stability of the valve spring holder.

In some examples, as shown in FIG. 8 and FIG. 9, the limiting groove 140 is exposed to the first surface 1101 of the body part 110 located on the first side, a surface of the first supporting part 121 connected to the first surface 1101, and a surface of the second supporting part 122 connected to the first surface 1101. Thereby, the limiting component can be placed in the limiting groove conveniently.

In some examples, as shown in FIG. 8 and FIG. 9, the valve spring holder 100 further includes a pin hole 160 and a limiting pin 170. The pin hole 160 is located in the first supporting part 121 and the second supporting part 122 and runs through the limiting groove 140. The limiting pin 170 is configured to be inserted into the pin hole 160 so as to fix the limiting component 150 in the limiting groove 140. That is, both the first supporting part 121 and the second supporting part 122 are provided with the pin hole 160 and the limiting pin 170, so that both of the two ends of the limiting component can be fixed in the limiting groove 140 in the first supporting part 121 and the second supporting part 122 respectively.

Embodiments of the disclosure further provide a valve box. FIG. 10 is a schematic structural view of a valve box according to an embodiment of the disclosure. As shown in FIG. 10, the valve box 200 includes a valve box body 290, a first cavity 210 located in the valve box body 290, a supporting slot 214 and a valve box recess 215. The first cavity 210 extends along a third direction. The supporting slot 214 is located on an inner side wall of the first cavity 210 and extends along a circumferential direction of the first cavity 210. The supporting slot 214 includes an inclined side wall 2140, configured to be in contact with the first supporting surface and the second supporting surface. The valve box recess intersects with the inclined side wall and extends along the third direction. It is to be noted that the above-mentioned "circumferential direction" refers to the direction around the cross section of the first cavity.

In some examples, as shown in FIG. 10, the valve box 200 further includes a second cavity 220, located in the valve box body 290 and extending along a fourth direction. The second cavity 220 and the first cavity 210 intersect and form an intersection region 230, and the supporting slot 214 and the valve box recess 215 are located in the intersection region 230. For example, the third direction and the fourth direction may be perpendicular to each other.

Embodiments of the disclosure further provide a plunger pump, including the valve spring holder and the valve box according to the above embodiments. FIG. 6 is a schematic structural view of a fluid end in a plunger pump according to an embodiment of the disclosure. FIG. 7A is a schematic cross-sectional view of a fluid end according to FIG. 6. FIG. 7B is a schematic cross-sectional view of another fluid end according to FIG. 6. As shown in FIG. 6, FIG. 7A and FIG. 7B, the plunger pump 900 includes the fluid end 300. The fluid end 300 includes the valve spring holder 100 and the valve box 200 described above. The first supporting surface 1210 and the second supporting surface 1220 of the valve spring holder 100 may be configured to be in contact with the supporting slot 214 (e.g., the inclined side wall 2140), so that the valve spring holder 100 is fixed in the third direction. The limiting component 150 may be partially located in the valve box recess 215 so as to be clamped in the valve box recess 215, thereby limiting the rotation of the valve spring holder 100.

In the plunger pump according to the embodiments of the disclosure, the valve spring holder can prevent the pressure of the fluid from being conducted to the sealing component and has the advantages of simple structure, easy installation, small throttling area, etc., so the plunger pump has the advantages of higher stability in use, longer service life, lower maintenance difficulty, higher efficiency, etc.

In some examples, as shown in FIG. 6, FIG. 7A and FIG. 7B, the fluid end 300 further includes a valve component 400. The valve component 400 includes a valve spring 410, a valve body 420 and a valve seat sleeve 430. One end of the valve spring 410 is connected to the spring mounting part 130 of the valve spring holder 100, and the other end of the valve spring 410 is connected to the valve body 420. The valve seat sleeve 430 is fixed in the first cavity 210, and includes a middle hole 435.

As shown in FIG. 6, FIG. 7A and FIG. 7B, the fluid end 300 further includes a sealing component 500 and a plunger 600. The sealing component 500 is located at one end of the second cavity 220, and the plunger 600 is at least partially located at the other end of the second cavity 200 and can make a reciprocating movement in the second cavity 220. The sealing component 500 may include a gland bush 510 and a gland nut 520. The gland bush 510 may be tightly connected to one end of the second cavity 220 through threads, and the gland nut 520 may press the gland bush 510 tightly, so as to seal one end of the second cavity 220.

As shown in FIG. 6, FIG. 7A and FIG. 7B, when the valve spring 410 is installed on the valve spring holder 100, the inclined side wall 2140 of the supporting slot 214 of the valve box 200 may apply a force to the valve spring 410 toward the valve seat sleeve 430 through the first supporting surface 1210 and the second supporting surface 1220. At this time, under the action of the elastic force of the valve spring 410, the valve body 420 is located in the valve seat sleeve 430 and seals the middle hole 435 of the valve seat sleeve 430. When a fluid flows along a direction from the valve body 420 to the valve spring holder 100, the fluid may apply a pressure to the valve body 420 such that the valve spring 410 is in a compressed state, and at this time, the fluid can flow through the middle hole 435 of the valve seat sleeve 430. When the fluid flows along a direction from the valve spring holder 100 to the valve body 420, the valve body 420 is subjected to a force toward the valve seat sleeve 430, and at this time, the fluid cannot flow through the middle hole 435 of the valve seat sleeve 430. In this case, the low-pressure fluid may be sucked into the first cavity 210 and the second cavity 220 from the outside through the valve component when the plunger 600 makes a backward movement (movement in the direction away from the gland bush); and the low-pressure fluid in the first cavity 210 and the second cavity 220 may be pressurized when the plunger 600 makes a forward movement (movement in the direction close to the gland bush), so that the low-pressure fluid is converted into the high-pressure fluid.

In some examples, as shown in FIG. 6, FIG. 7A and FIG. 7B, by configuring the first supporting surface 1210 and the second supporting surface 1220 to be in contact with the inclined side wall 2140 of the supporting slot 214 of the valve box 200, the first supporting part 121 and the second supporting part 122 can fix the valve spring holder 100 in the first cavity 210 inside the valve box 200. The limiting groove

140 may be configured to place the limiting component 150, and the limiting component 150 may be exposed from the first supporting surface 1210 and/or the second supporting surface 1220, and clamped in the valve box recess 215 in the inner side wall of the cavity 210, thereby limiting the rotation of the valve spring holder 100.

On the one hand, since the valve spring holder 100 does not need to be in contact with or connected with the gland bush 510 at the end part of the second cavity 220, the force produced by the fluid will not be conducted to the gland bush 510, thereby avoiding fatigue fracture of the thread of the gland bush 510 and other problems. Therefore, the plunger pump has longer service life and lower maintenance cost.

On the other hand, the valve spring holder 100 is simple in structure, and the limiting component 150 can be clamped in the valve box recess 215 by rotating the valve spring holder 100 after the body part 110, the first supporting part 121 and the second supporting part 122 of the valve spring holder 100 are installed in place, so the valve spring holder has lower installation difficulty. Therefore, the plunger pump also has lower installation and maintenance difficulty.

In addition, since the valve spring holder 100 is simple in structure and does not need to be connected to the gland bush 510, the valve spring holder 100 has smaller throttling area and smaller obstruction to the flow of the fluid, thereby improving the efficiency of the plunger pump.

In some examples, the plunger pump may be applied to fracturing equipment and used in fracturing operation of oil and gas fields. In addition, the power end of the plunger pump may include a crankshaft connecting rod mechanism, so that the rotational movement input by the prime mover can be converted into the reciprocating movement of the plunger. The prime mover may be a diesel engine, an electric motor, a turbine engine, etc., which will not be described in detail in the embodiments of the disclosure.

It is to be noted that:

(1) In the accompanying drawings of the embodiments of the disclosure, only the structures involved in the embodiments of the disclosure are involved, and for other structures, reference may be made to general design.

(2) In the case of no conflict, features in the same embodiment and different embodiments of the disclosure may be combined with each other.

The foregoing descriptions are merely specific implementations of the disclosure, but the protection scope of the disclosure is not limited thereto. Any variation or replacement readily figured out by those skilled in the art within the technical scope disclosed in the disclosure shall fall within the protection scope of the disclosure. Therefore, the protection scope of the disclosure shall be subject to the protection scope of the claims.

The invention claimed is:

1. A valve spring holder, comprising:
a body, comprising a first end structure, a second end structure, and a middle structure located between the first end structure and the second end structure;
a first supporting structure, connected to the first end structure and located on a first side of the body structure;
a second supporting structure, connected to the second end structure and located on the first side of the body structure;
a spring mounting structure, connected to the middle structure and located on a second side of the body, the second side and the first side being two opposite sides; and a limiting groove, configured to place a limiting structure;
wherein the first supporting structure comprises a first supporting surface located at one end of the first supporting structure away from the first end structure, the second supporting structure comprises a second supporting surface located at one end of the second supporting structure away from the second end structure, and the first supporting surface and the second supporting surface are configured to be in contact with a valve box;
the limiting groove is located in at least one of the first supporting structure and the second supporting structure, and exposed to at least one of the first supporting surface and the second supporting surface;
the first supporting structure extends along a first direction, and the second supporting structure extends along a second direction; and
an included angle between the first direction and a direction perpendicular to a first surface of the body located on the first side ranges from 120 to 150 degrees, and an included angle between the second direction and a direction perpendicular to the first surface of the body located on the first side ranges from 120 to 150 degrees.

2. The valve spring holder according to claim 1, wherein the limiting groove is also located at the body.

3. The valve spring holder according to claim 1, wherein the limiting groove comprises a first end and a second end, the first end is located on the first supporting surface, the second end is located at the second end structure, and the limiting groove extends from the first supporting surface to the second end structure.

4. The valve spring holder according to claim 3, wherein the limiting groove is exposed to the first surface of the body located on the first side and a surface of the first supporting structure connected to the first surface.

5. The valve spring holder according to claim 4, wherein the second end runs through the body and is exposed to the second surface of the body located on the second side.

6. The valve spring holder according to claim 1, wherein the limiting groove comprises a first end and a second end, the first end is located on the first supporting surface, the second end is located on the second supporting surface, and the limiting groove extends from the first supporting surface to the second supporting surface.

7. The valve spring holder according to claim 6, wherein the limiting groove is exposed to the first surface of the body located on the first side, a surface of the first supporting structure connected to the first surface, and a surface of the second supporting structure connected to the first surface.

8. The valve spring holder according to claim 1, further comprising:
the limiting structure, located in the limiting groove,
wherein the limiting structure comprises a limiting part, and the limiting part protrudes from the first supporting surface and/or the second supporting surface.

9. The valve spring holder according to claim 8, wherein the limiting structure comprises a circlip.

10. The valve spring holder according to claim 1, further comprising:
a pin hole, located in the first supporting structure and/or the second supporting structure and running through the limiting groove; and
a limiting pin, configured to be inserted into the pin hole so as to fix the limiting structure in the limiting groove.

11. A plunger pump, comprising:
a valve box, comprising a valve box body, a first cavity, a supporting slot and a valve box recess, the first cavity being located in the valve box body and extending along a third direction, the supporting slot being located on an inner side wall of the first cavity and extending along a circumferential direction of the first cavity, the supporting slot comprising an inclined side wall, and the valve box recess intersecting with the inclined side wall and extending along the third direction; and a valve spring holder, comprising a body, a first supporting structure, a second supporting structure, a spring mounting structure and a limiting groove, the body comprising a first end structure a second end structure and a middle structure located between the first end structure and the second end structure, the first supporting structure being connected to the first end structure and located on a first side of the body, the second supporting structure being connected to the second end structure and located on the first side of the body, the spring mounting structure being connected to the middle structure and located on a second side of the body, the second side and the first side being two opposite sides, and the limiting groove being configured to place a limiting structure;

wherein the first supporting structure comprises a first supporting surface located at one end of the first supporting structure away from the first end structure, the second supporting structure comprises a second supporting surface located at one end of the second supporting structure away from the second end structure, and the first supporting surface and the second supporting surface are configured to be in contact with a valve box;

the limiting groove is located in at least one of the first supporting structure and the second supporting structure, and exposed to at least one of the first supporting surface and the second supporting surface; and the first supporting surface and the second supporting surface are configured to be in contact with the supporting slot, and the limiting structure is partially located in the valve box recess.

12. The plunger pump according to claim 11, wherein the valve box further comprises:

a second cavity, located in the valve box body and extending along a fourth direction, wherein the second cavity and the first cavity intersect and form an intersection region, and the supporting slot and the valve box recess are located in the intersection region.

13. The plunger pump according to claim 11, wherein the limiting groove is also located at the body.

14. The plunger pump according to claim 11, wherein the first supporting structure extends along a first direction, and the second supporting structure extends along a second direction; and an included angle between the first direction and a direction perpendicular to a first surface of the body located on the first side ranges from 120 to 150 degrees, and an included angle between the second direction and a direction perpendicular to the first surface of the body located on the first side ranges from 120 to 150 degrees.

15. The plunger pump according to claim 11, wherein the limiting groove comprises a first end and a second end, the first end is located on the first supporting surface, the second end is located at the second end structure, and the limiting groove extends from the first supporting surface to the second end structure.

16. The plunger pump according to claim 15, wherein the limiting groove is exposed to the first surface of the body located on the first side and a surface of the first supporting structure connected to the first surface.

17. The plunger pump according to claim 16, wherein the second end runs through the body and is exposed to the second surface of the body structure located on the second side.

* * * * *